United States Patent [19]
Freudenthal et al.

[11] 3,779,911
[45] Dec. 18, 1973

[54] WASTE TREATMENT APPARATUS

[75] Inventors: Hugo D. Freudenthal, Wantagh;
Richard E. Townsend, Huntington;
Peter K. Zawoiski, North Babylon;
Edward Schatz, Setauket, all of
N.Y.

[73] Assignee: Fairchild Industries, Germantown, Md.

[22] Filed: July 12, 1971

[21] Appl. No.: 161,608

[52] U.S. Cl.................. 210/60, 210/63, 210/104, 210/151, 210/194, 210/213
[51] Int. Cl............................................ B01d 21/24
[58] Field of Search ............... 210/63, 61, 96, 104, 210/122, 149, 150, 157, 179, 187, 199, 213, 60, 194; 261/92; 252/361

[56] References Cited
UNITED STATES PATENTS
2,181,404   11/1939   Koppitz et al. ............... 210/414 X

*Primary Examiner*—J. Adee
*Attorney*—Michael W. York

[57] ABSTRACT

A waste treatment apparatus which includes a rotatable drum having an inlet at one end to receive the waste sewage to be treated within the drum and outlets for the treated waste at the opposite end. The rotatable waste treatment drum is inclined in a stationary frame so that the waste sewage will flow from the inlet toward the outlet during the treatment cycle, under the influence of gravity while being exposed to separate treatment stages in batches, separated within the drum by a helical member. The helical member is sealingly connected to the interior wall of the rotatable drum and to an axial hollow core member and forms a plurality of variably spaced convolutions that are formed about the axial hollow core member so that as the drum rotates the batches of waste sewage disposed in the lower segment of the drum between the convolutions of the helical member, are successively raised to a higher level as the drum is rotated and the waste is undergoing treatment. Clarified liquid effluent is removed during the treatment cycle through the hollow core member and part of the treated liquid effluent containing active microorganisms is introduced to the untreated waste entering the inlet end of the drum. Rotation of the drum and selective aeration of the waste sewage is controlled by a control system associated with the rotatable drum and the control system has chemical sensing and dispensing apparatus that sense the chemical concentrations or pH of the wastes being treated and add chemicals to the wastes when needed. The wastes are treated to produce a clarified liquid effluent and a sludge that are automatically separated and collected in separate containers and may be safely put to a useful purpose such as the replenishment of a water supply and use as a fertilizer. The treated and collected sludge is also dried so that it will be readily usable as a nutrient or fertilizer, or can be stored as an innocuous material.

8 Claims, 7 Drawing Figures

3,779,911

PATENTED DEC 18 1973

INVENTORS
Hugo D. Freudenthal
Richard E. Townsend
Peter K. Zawoiski
Edward Schatz By Michael W. York
Attorney

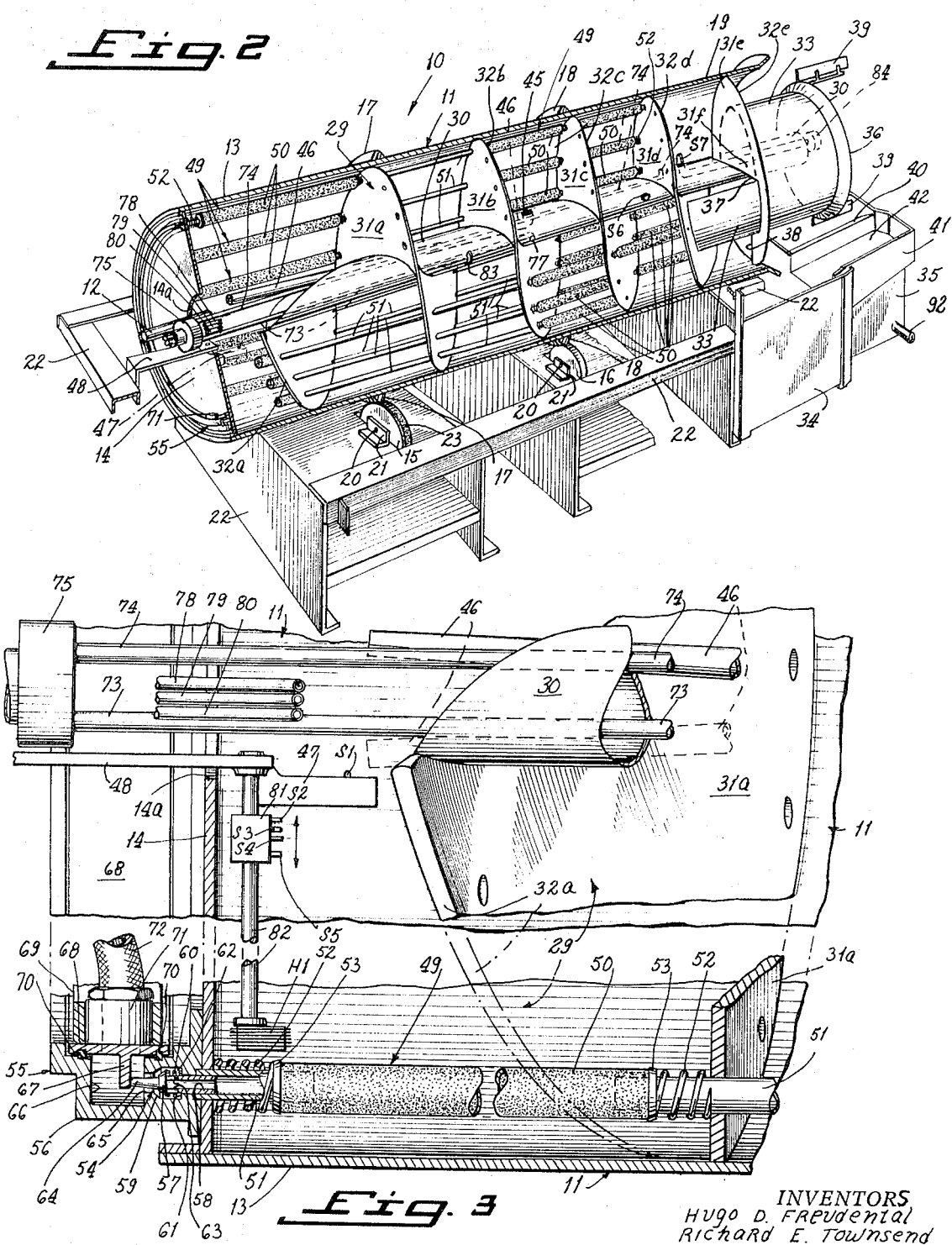

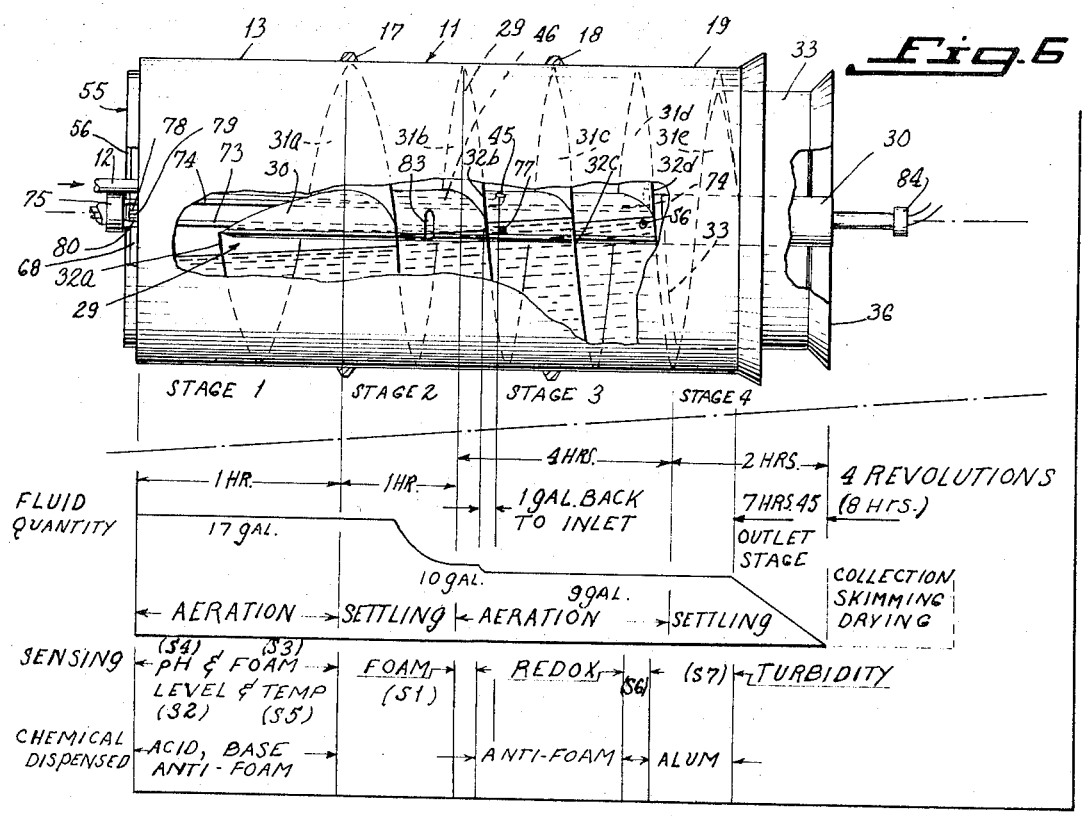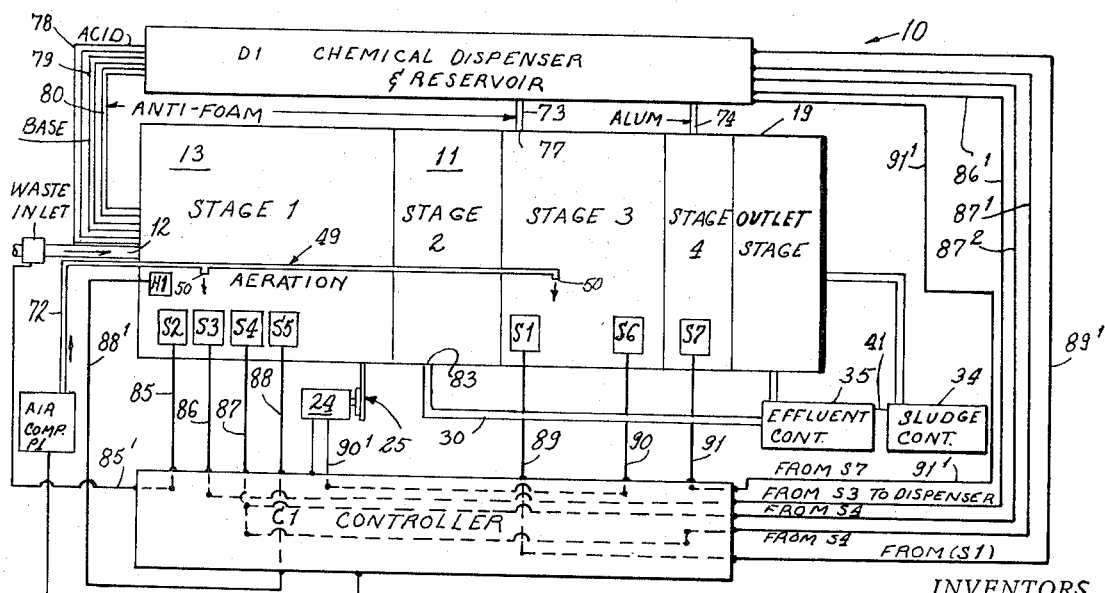

WASTE TREATMENT APPARATUS

BACKGROUND OF THE INVENTION

Many types of systems have been proposed for the treatment and handling of wastes including sewage and the like, and among these are the familiar septic tank, cesspool system and systems that employ a central sewage treatment plant of the type generally used and relied upon for waste disposal by many municipalities and urban centers. Over the years these systems have become increasingly burdened under the strain of burgeoning populations and of late a majority of these systems, due to their inability to properly treat the unanticipated quantities of wastes generated by the expanding populations have been found to be among the leading contributors to pollution and ecological damage.

Septic tank and cesspool systems have been satisfactorily used for many years. The liquid wastes from these systems are drained into the surrounding soil. When such systems were widely scattered the filtration processes which took place in the soil were adequate to prevent any widespread soil contamination. However, the profileration of these waste sewage systems have in many instances resulted in serious ground contamination and contamination of underground water supplies as a result of the cumulative outflow of wastes from such systems. In the past when these problems have become critical and were acknowledged as posing a serious threat to the health and well-being of the population, the accepted remedy was to establish and construct centralized waste treatment plants.

When such centralized plants are used, they require an elaborate system of sewers to convey the wastes from the various sources of waste production to the centralized treatment facility. The installation of such a centralized system is extremely difficult and expensive, not only because of the nature and complexity of such a system, but also due to the frequent need to condemn property, arrange and purchase easements for the installation of feeder lines and the like, and the need to reconstruct the ground contour, pavement, and highways which must necessarily be disturbed during the course of the installation of such a system. In addition, changing patterns in housing locations have made it extremely difficult to predict with any degree of accuracy, the ultimate treatment capacity that will be required of the centralized waste treatment plants that are to be constructed. As a result, there is a tendency to construct larger, more elaborate, and costlier treatment plants in the belief that continued population growth will eventually justify such elaborate and costly installations. Obviously, the population growth in these communities may not always materialize so that many new plants never accommodate the quantities of waste that they have been designed to handle. Not only is this grossly inefficient, but the financial ramifications of such actions are far reaching, in that the particular communities to be serviced by these facilities may not be developed to the point where they can support such construction.

Even when such centralized treatment plants have been in existence and operation, their capacities in many instances have not ben sufficient to adequately meet the requirements of a growing population. As a result, their ability to adequately treat and dispose of the waste has been seriously hampered and all too often improperly treated wastes have been dumped into receiving waters such as rivers and the like, further aggravating the already serious pollution problems and contributing to the sustenance of the ecological destruction that is receiving increased attention at the present time.

In addition to these problems, recent studies have focused attention on a growing need for a system capable of producing a high quality water effluent which can be recirculated and used or returned to the ground for irrigation, or in some goegraphical areas to resist the encroachment of sea-water into underground water supplies. Such high quality water effluent can be obtained from properly treated waste sewage which can be recirculated for use in this manner.

In the light of these difficulties and the heightened attention being focused on these problems, a number of waste treatment systems have been proposed in the prior art. These encompass a variety of approaches ranging from the improved septic tank structure shown and described in U.S. Pat. No. 3,057,796 to the more sophisticated and complex systems shown and described in U.S. Pat. No. 3,056,742 which provides an improved aeration system that utilizes compressors and pumps to improve and encourage the breakdown of household sewage wastes. Other prior art patents such as U.S. Pat. Nos. 3,472,182; 3,357,377 and 3,027,854 disclose typical equipment that may be utilized in combustion processes to bring about the thermal destruction of the wastes.

While each of the prior art systems purport to provide improved waste treatment systems, a number of deficiencies remain because of their basic inadequacies, as already discussed with respect to septic tank systems, their complexity or shortcomings insofar as their abilities to reduce the pollutants in the waste, energy consumption characteristics or fuel requirements. In addition, those systems which rely on combustion principles tend to present heat management problems as well as atmospheric pollution problems which would tend to become aggravated with widespread use and therefore become more detrimental to the environment. Furthermore, the normal equipment deterioration which could be expected with continued use of these prior art devices over extended periods can only enhance rather than diminish their shortcomings.

The apparatus of the present invention overcomes these difficulties by providing an improved and efficient waste sewage treatment apparatus that is capable of independent operation in individual dwellings or establishments as well as in multiple dwellings, schools, hospitals and the like by simply enlarging its capacity. In addition, the improved apparatus of this invention has added utility in connection with its use in combination with existing centralized waste treatment facilities to improve the digestion and treatment quality of the wastes emanating therefrom and thus to prevent pollution that would result from the otherwise improperly treated wastes from such facilities.

SUMMARY OF THE INVENTION

This invention relates to waste treatment apparatus of the type which promote microbiological reduction and aerobic digestion of waste sewage into a clarified liquid effluent and a sludge, and more particularly to waste treatment apparatus that are suitable for use in and for individual or multiple dwellings, schools, hospitals, hotels and other establishments or in combination with centralized sewage treatment plants to continue and to improve the treatment of the wastes emanating therefrom.

It is therefore an object of the present invention to provide a waste treatment apparatus that can be readily adapted to accommodate a wide range of waste sewage capacities.

Another object of the present invention is to provide a waste treatment apparatus that can be utilized as a sole and independent treatment device or be capable of use in combination with other waste treatment apparatus to further refine their outputs.

It is also an important object of the present invention to provide an improved waste treatment apparatus that will promote the efficient microbiological reduction of waste sewage into a clarified effluent and a sludge in an economical manner, and which is capable of continuous, silent and economical operation for prolonged periods without attention.

Another object of the present invention is to provide an improved waste treatment apparatus that is capable of completely automatic operation with a minimum of maintenance while operating in accordance with stringent sanitary codes to produce treated sewage which will not have detrimental effect on the ecology.

A still further object of the present invention is to provide a waste treatment apparatus wherein the complete microbiological reduction and aerobic digestion of wastes may be accomplished within the apparatus and wherein the wastes when so treated will automatically be separated into a clarified liquid effluent and a sludge that can be easily disposed of.

It is also an object of the present invention to provide waste treatment apparatus wherein the microbiological reduction and aerobic digestion of the wastes will effect the production of a high quality liquid effluent which can be used to replenish a non-potable water supply or other useful purpose, and a sludge which can be safely and efficiently used as a nutrient.

It is also an object of this invention to provide a waste treatment apparatus that is capable of convenient and economical installation near or within existing dwellings and establishments, as well as being capable of installation during the course of the construction of new dwellings and establishments with relative ease and convenience.

It is also an object of the present invention to provide a process for treating waste in which portions of the waste are separated by the convolutions of a helical member and subjected to different waste treatments.

The present invention provides a waste treatment apparatus for the treatment of waste such as sewage and the like which includes a rotatable drum having a waste inlet and at least one treated waste outlet, mounting means for rotatably mounting the drum, means for rotating the drum and a helical member having a plurality of convolutions whose outer edges are sealingly affixed to the interior surface of the drum for assisting in transporting the wastes within the drum. The convolutions are more widely spaced near the inlet end of the drum than near the outlet end of the drum to provide less volume for the wastes between the convolutions located near the outlet end of the drum.

BRIEF DESCRIPTION OF THE DRAWINGS

The inventon will be hereinafter more fully described with reference to the accompanying drawings in which:

FIG. 2 is a perspective view of the waste treatment apparatus illustrated in FIG. 1 on a slightly reduced scale and viewed at a slightly different angle with certain parts in section or removed and others broken away for clarity;

FIG. 3 is an enlarged broken elevational view partially in section of a portion of the structure illustrated in FIG. 1 showing various components of an aeration system as well as the location and configuration of various components situated at the inlet end of the apparatus of the present invention;

FIG. 6 is a diagrammatic view which depicts the level of the wastes, timing and sequence of events as they occur in the waste treatment apparatus of the present invention; and FIG. 7 is a system and control diagram which provides a schematic representation of the sensing, timing and control functions of the apparatus of the present invention.

DETAILED DESCRIPTION OF THE PREFERRED EMBODIMENT

Figure 1:
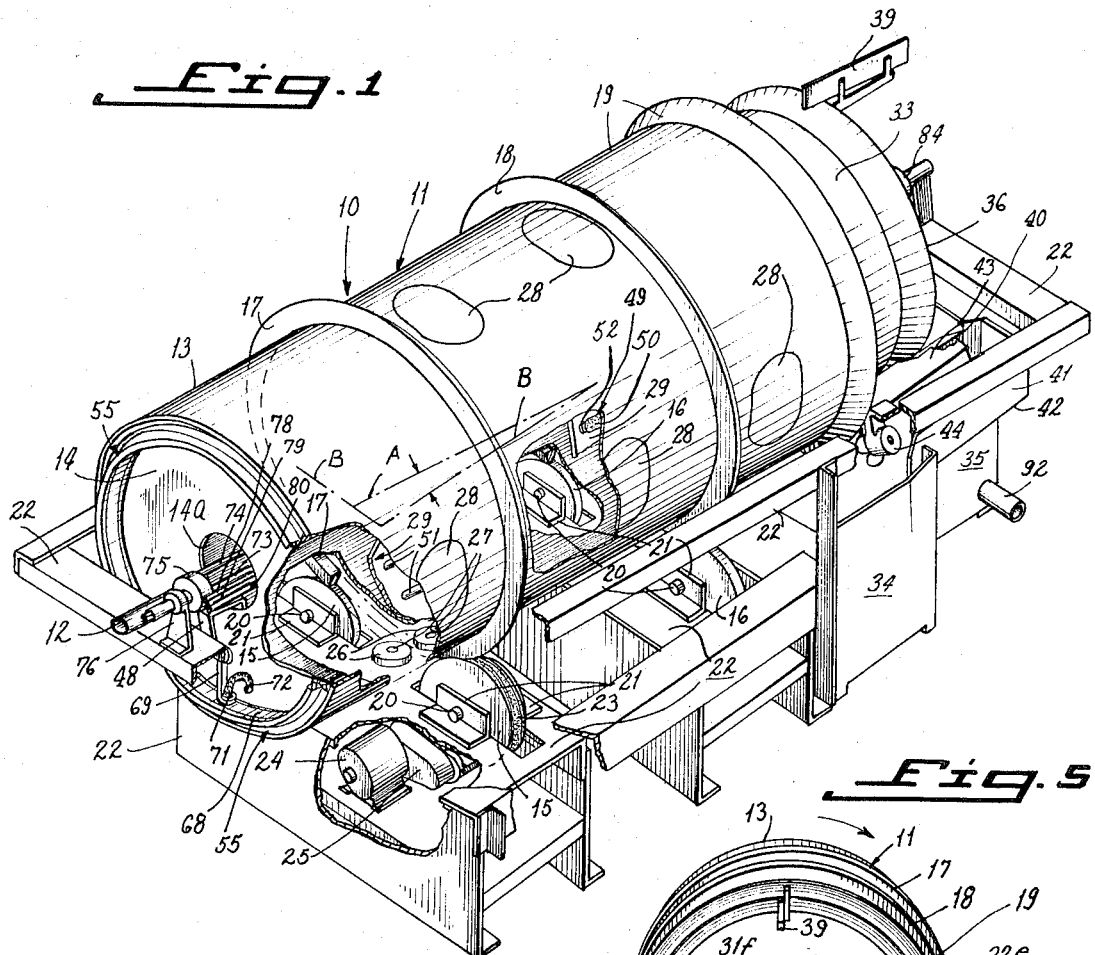
FIG. 1 is a perspective view of the waste treatment apparatus of the present invention with certain parts broken away for clarity.

Reference should be made to FIGS. 1 and 2 in the drawings, wherein it will be noted that the waste treatment apparatus of the present invention is generally designated by the reference number 10. A rotatable drum 11 comprises the principle part of the invention in which the entire microbiological reduction of the waste sewage that is undergoing treatment according to the present invention is accomplished. The specific treatment capacity of the particular apparatus may therefore be varied by varying the size of the drum 11 to match the waste sewage production in a particular installation in accordance with well known and established practices. In other words, dwellings for single family occupancy are known to require a given sewage treatment capacity, while multiple occupancy dwellings, business establishments, schools, hospitals and the like generally require much larger capacities to accommodate the much larger volumes of waste sewage which are normally produced therein.

The effectiveness of the waste sewage treatment apparatus of the present invention is substantially improved if the normal preliminary measures of separating greases and comminuting solids in the waste are accomplished prior to introducing the waste into the apparatus of the invention. This may be done through the use of a conventional grease filter or trap for greases and a communitor to reduce the solid particle size in a manner that is well known and customarily used to improve the performance and efficiency of the treatment of wastes in a majority of waste treatment systems.

It will be appreciated that the process of microbiological reduction of waste matter such as sewage and the like is well known and understood by those skilled in the art, and thus a detailed discussion of this process except insofar as it is carried out in the present apparatus will not be provided herein.

The waste sewage that is to be treated is introduced into the drum 11 through an inlet tube 12 that is provided at the end of the forward portion of the drum 11, which will hereinafter be referred to as the inlet end portion 13 and the waste sewage is contained within the inlet end portion by a drum inlet end plate 14 that is connected to the end of the inlet end portion and has a central inlet or aperture 14a to permit the inlet tube 12 and other members yet to be described to extend into the interior of the drum 11. Thereafter, treatment of these wastes takes place within the confines of the drum 11 as will hereinafter be described in detail.

The drum 11 is supported or rotatably mounted by mounting means comprising two pairs of rollers 15 and 16 that are operatively associated with the drum and are located below the drum and are in contact with respective bands 17 and 18 that surround and are fixedly connected to the outer cylindrical surface of the drum. The rollers 16 are smaller in diameter than the rollers 15 so that the longitudinal axis A of the drum is inclined with respect to a horizontal plane B and the inlet end portion 13 is elevated with respect to the opposite end of the drum which will be referred to as the outlet end portion 19 of the drum. In order to obtain this inclination, it will be noted that the larger diameter rollers 15 are in contact with the band 17 that is located toward the inlet end portion 13 of the drum and the smaller diameter rollers 16 are in contact with the band 18 that is located toward the outlet end portion 19 of the drum. This inclination of the drum will permit gravity to assist in moving the waste sewage within the drum 11 as the drum is rotated and the waste undergoes microbiological reduction as it proceeds from the inlet end portion 13 toward the outlet end portion 19 of the drum. Each of the drum support rollers 15 and 16 are rotatably mounted on their respective shafts 20 which are positioned and suitably held in mounting brackets 21 of a stationary frame 22 that supports the drum 11 and forms part of the drum mounting means. One of the support rollers 15 serves a dual purpose in that it is additionally utilized to rotate the drum 11 through the frictional engagement of a tire 23 that is located around the outer periphery of this roller, with the band 17 which surrounds the drum. The tire 23 is fixedly mounted to the circumferential edge of the roller 15 so that rotation imparted to the roller is transmitted through the tire to the drum 11.

Drum rotating means comprising a driving motor 24 for rotating the drum 11 is also mounted on the stationary frame 22 in a conventional manner and is operatively connected to the drum and adapted to drive the tire equipped roller 15 by means of a pulley and belt arrangement generally designated by the reference number 25 that is operatively connected to the motor 24 is adapted to rotate the drum assembly at the relatively low speed of approximately ½ revolution per hour, under the influence of a control system which will be hereinafter described in detail. In addition, a pair of guide rollers 26 are rotatably mounted substantially horizontally on shafts 27 which extend in an upward direction from the frame 22. These guide rollers 26 are disposed between the frame 22 and the drum 11 and are adapted to engage the opposite sides of the band 17 that is connected to the drum to assist in guiding the drum 11 during its rotation and to resist any tendency of the drum 11 to shift on the frame 22, due to its inclination or to any imbalance caused by the movement of the waste within the drum 11 as the waste is undergoing treatment. The drum 11 is also provided with a number of removable access covers 28 which may be securely held to the drum in leakproof fashion, by any of a variety of well known means (not shown) to permit access to the interior of the drum through the access ports covered by the removable access covers to facilitate the assembly of various components within the drum and to permit periodic inspection or maintenance.

As best illustrated in FIG. 2 of the drawings, the drum 11 contains helical means comprising a helical member 29 that is adapted to rotate with the drum which extends axially within the drum 11 and is formed about a hollow tubular core member 30 that is concentrically held within the drum by the helical member. The helical member 29 comprises a plurality of variably spaced convolutions 31a, 31b, 31c, 31d and 31e which surround the core member 30 and extend in an axial direction within the drum 11, and are non-uniformly spaced within the drum and diminish in their spacing as they proceed toward the outlet end portion 19 of the drum 11. As used herein, the term convolution refers to that portion of the helical member 30 whose inner edge that is sealingly connected to the outer surface of the tubular core member 30 makes one complete 180° rotation about the outer surface of the tubular core member. The outer peripheral edges 32a, 32b, 32c, 32d and 32e of the respective helices or convolutions which make up the helical member 29 are sealingly affixed to the interior wall surface of the drum 11, so that the drum wall and the helices or convolutions of the helical member cooperatively form a plurality of waste sewage treatment chambers which can contain the waste sewage in the lower portion of the drum 11. Consequently, waste sewage which is communicated to the interior of the drum 11 through the inlet tube 12 will accumulate in the lower segment of the drum in the area defined by and sealed by the inlet end plate 14 and the first convolution 31a of the helical member 29. As the drum 11 is rotated by the drive motor 24, belt drive and pulley 25 and the tire equipped roller 15, the accumulated waste sewage will move into contact with each successive convolution 31a, 31b, 31c, 31d and 31e and be transported toward the outlet end portion 19 of the drum as the waste sewage undergoes microbiological reduction. As the axial spacing between the successive convolutions formed by the helical member 29 diminishes toward the outlet end portion 19 of the drum 11, the level of the waste sewage contained between the more closely spaced convolutions rises because the axial volume between the convolutions is reduced. Although some of the wastes are removed from the drum during the course of the treatment cycle, as will hereinafter be described, the spacing between the convolutions is adapted to compensate for the quantities of waste that are removed during the treatment cycle so that the remaining wastes are contained within a more confined axial volume than existed between the convolutions located toward the inlet end portion 13 of the drum. In this manner the levels of the wastes remaining within the convolutions of the helical member is controlled by the spacing of the convolutions.

It will be noted in FIGS. 1, 2, 5 and 6 of the drawings that means operatively connected to the drum for separating the products from the waste treatment into a sludge and a clear liquid comprising an inner hollow tubular or cylindrical drum member 33 is affixed to and extends from the final helix or convolution 32e of the helical member 29. This inner drum member 33 is located concentrically within and extends beyond the furthermost extremity of the outlet end portion 19 of the drum 11. The primary purposes of this inner drum member 33 are to separate the clear liquid effluent and the sludge which result from the microbiological reduction of the wastes and to facilitate their collection in containment means for receiving the products resulting from the treatment of the waste comprising separate containers 34 and 35. These containers 34 and 35 are respectively disposed beneath and adjacent to the end of the outlet end portion 19 of the drum 11, and the discharge end 36 of the inner drum member 33 so that sludge from the outlet end portion of the drum can be deposited in the sludge container 34 while the clarified liquid effluent which rises above the sludge passes into the inner drum member 33 and is directed from the discharge end of the inner drum member to the effluent container 35 in a manner which will hereinafter be described in greater detail.

Figure 5:
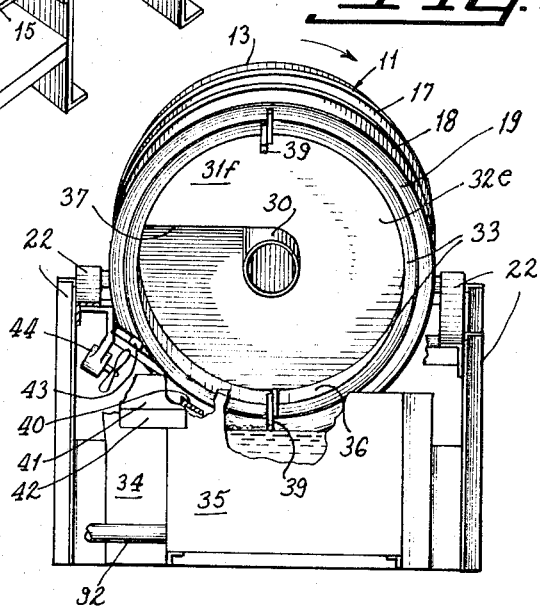
FIG. 5 is a rear elevational view of the apparatus of the present invention illustrated in FIG. 1 showing its outlet end and the configuration and location of the containment apparatus associated with the present invention.

As illustrated in FIGS. 2 and 5 of the drawings, a weir 31f is formed by a portion of the final helix 31e of the helical member 29 which partially terminates in a straight edge 37 so that an opening or treated waste outlet for the drum exists between the final convolution and the interior of the inner drum member 33. A weir 38 is also formed by a flat plate which is an extension of the outer portion of the weir 31f and is bonded to the exterior surface of the inner drum member 33 and the interior surface of the drum 11 and which when properly located will permit discharge of wastes from the bottom of the open outlet end portion 19 into the sludge container 34 in a manner which will hereinafter be described in detail.

As best illustrated in FIGS. 1, 2 and 5, the inner drum member 33 is equipped with a pair of skimming paddles 39 which are located opposite each other and are fixed to and extend from the furthermost end of the inner drum member. These paddles 39 are adapted to skim the surface of the collected liquid effluent in the container 35 and to push surface scum located on the surface of the liquid effluent over an inclined ramp 40 of a scum trough 41 and into the scum trough which is located below and slightly to one side of the inner drum member 33. The scum trough 41 is connected to the sludge container 34 and has a lower bottom surface 42 that slopes toward the container 34 so that the scum that is pushed into the scum trough slides into the sludge container under the influence of gravity. As illustrated in FIG. 1, a stationary sludge scraper 43 supported from the frame 22 is provided adjacent to the outside surface of the inner drum member 33 above the trough 41. This scraper 43 is located in close proximity to the outer surface of the inner drum member 33 and is adapted to scrape any sludge which may adhere to the outer surface of the inner drum member off the outer surface of the drum member and to permit the scum to fall into the sludge trough 41 under the influence of gravity. The scraper 43 also supports a sludge drying fan 44 that is situated thereon and is adapted to provide a continuous flow of air to the collected sludge in the container 34 to rapidly dry the sludge as it is collected and thus facilitate its use as a fertilizer or nutrient, or its safe storage as an innocuous material for later disposal.

As heretofore mentioned, the hollow core member 30 is located at the center of the helical member 29 and it encloses a number of tubes and is provided with a plurality of outlets, ports and sensors which form an essential part of the apparatus provided herein for bringing about the improved waste treatment or microbiological reduction of the wastes in accordance with the teachings of the present invention. These tubes, outlets, ports and sensing elements will hereinafter be discussed in greater detail. One of these ports is denoted by the reference number 45 and is located in the hollow core member 30 at a predetermined distance from the inlet end portion 13 of the drum 11 and it provides a passage for liquid treated waste or effluent which has been raised above the level of the port as a result of close spacing of the helices or convolutions of the helical member 29 near the port. This may best be seen in FIG. 2 of the drawings wherein it will be noted that the port 45 is provided in the hollow core member 30 between the two convolutions 31b and 31c that are spaced comparatively close together.

As best illustrated in FIGS. 2 and 3, a hollow tube 46 is located within and to one side of the longitudinal axis of the core member 30 and this tube extends from the port 45 toward the inlet end portion 13 of the drum 11. This tube 46 or tube member is positioned so that its longitudinal axis is inclined with respect to the already inclined axis of the core member 30 to permit drainage of a portion of the liquid wastes through the port 45 and the tube 46 toward the inlet end portion 13 of the drum 11 as the drum, helical member 29 and core member 30 are rotated as the waste undergoes treatment within the drum. As rotation of the assembly including the helical member 29 occurs, liquid effluent will pass through the port 45 into the tube 46 that is located within the hollow core member 30, and as the tube 46 orbits the center of rotation (longitudinal axis) of the hollow core member, the inclination of the tube 46 with respect to the axis of the core member will cause the tubular member to gradually assume a tilted position (the dotted line position in FIG. 3) so that its end nearest the inlet end portion 13 of the drum 11 will be lower than the other end that is connected to the port 45, thereby permitting the liquid effluent communicated to it, to flow under the force of gravity in the direction of the inlet end portion of the drum and into the interior of the inlet end portion of the drum near the inlet to the drum. In this manner, part of the liquid effluent or partially treated waste situated near the port 45 will be communicated through the port back toward the inlet end portion 13 of the drum 11, so that the active microorganisms contained in this partially treated liquid effluent will be mixed with the raw or untreated waste being accumulated within the inlet end portion of the drum. This method of introducing active microorganisms to the raw waste sewage is highly effective in promoting microbiological reduction of the raw waste, since the active microorganisms will feed upon the pollutants contained in the raw waste sewage.

As best illustrated in FIG. 3, a sampling container 47 is situated within the inlet end portion 13 of the drum 11 and is located to receive the outflow of liquid effluent being fed back through the tube 46. The container 47 is supported by a bracket 48 which projects from the frame 22 through the aperture 14a in the center of the inlet end plate 14 and into the drum 11. This enables the liquid effluent from the tube 46 to be sampled by a foam level sensor element S1 associated with the sampling container 47 in a manner which will be hereinafter discussed in greater detail. However, at this point it should be noted that the results of this sampling are utilized to determine whether excessive foaming of the waste sewage has resulted from the treatment of the waste in the drum. Such excessive foaming could be detrimental to the effectiveness of the microbiological reduction process so that an anti-foaming agent will be dispensed to retard such foaming based on the foam level sensor output.

Figure 4:
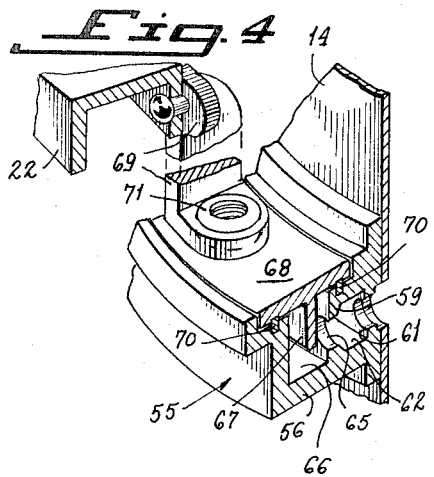
FIG. 4 is an enlarged broken perspective view in section of part of the lower forward portion of the structure illustrated in FIG. 1.

FIGS. 2, 3 and 4 of the drawings best illustrate the components of an aeration system associated with the rotatable drum 11 that assists in promoting the microbiological reduction of the raw waste sewage within the drum. If reference is made to FIGS. 2 and 3, it will be noted that a plurality of tubular members designated generally by the reference number 49 extend through the interior of the drum 11 with their long axes generally parallel to the long axis of the drum. These tubular members 49 pass through and are supported by the convolutions or helices 31a, 31b, 31c, 31d and 31e of the helical member 29 near their outer peripheral edges and they terminate at the next to last convolution of helix 31d in the outlet end portion 19 of the drum 11. The forward ends of these tubular members 49 extend through the inlet end plate 14 in the manner illustrated in FIG. 3 where only one of the tubular members is illustrated in the interest of clarity. The tubular members 49 are each provided with foraminous sections 50 that are adapted to permit air to pass through their walls that are interspaced along the length of the tubular members between selected convolutions or helices of the helical member 29. These foraminous sections 50 are adapted to permit the waste sewage to be selectively aerated in a programmed manner dependent upon drum rotation in a manner which will be described hereinafter in detail.

If particular reference is made to FIG. 3 in the drawings, it will be noted that the foraminous sections 50 are axially aligned with and are adapted to telescope or fit over and between rigid hollow nonforaminous tube section 51 of the tubular members 49. The foraminous sections 50 that are located in the inlet end portion 13 of the drum 11 are centrally held between the rigid tube sections 51 by pairs of compression springs 52. The compression springs 52 located near the end plate 14 encircle each rigid tube section adjacent to the end of the foraminous section 50 that is located near the end plate and they exert their spring forces between the inlet end plate 14 of the drum 11, and cup washers 53 that are located on the ends of the foraminous sections that are located near the inlet end plate. The compression springs 52 that are located near the opposite ends of these foraminous sections 50 are the springs that are part of the pairs of springs that hold the foraminous sections located in the inlet end portion 13 of the drum 11 and they each are located around the tubes 51 and exert their spring forces between cup washers 53 located on the opposite ends of the foraminous sections and the adjacent convolution or helix 31a of the helical member 29. The foraminous sections 50 that are located in the other portions of the drum 11 are centrally held by pairs of compression springs 52 in a similar manner, however, the springs exert their forces only against the respective convolutions of the helical member 29 and the respective cup washers 53 and not against the end plate 14. This arrangement facilitates the simple installation or removal of the foraminous sections 50 from the respective fixed rigid tube sections 51 for periodic cleaning or replacement, by permitting each foraminous section 50 to be moved axially against the force of either of the springs 52, compressing one of them until the end of the foraminous tube section can be displaced a sufficient distance so that it can be slipped over the end of the respective fixed rigid tube section. At this point it will be helpful to note that these foraminous sections should be made from a material that has some natural resiliency that will permit a certain amount of temporary distortion to take place to assist in their removal from the rigid tube sections 51 without inducing a permanent bend or kink in them.

In accordance with the teachings of the present invention, air under pressure is directed through the tubular members 49 only during that phase of drum revolution in which the foraminous tube sections 50 would be immersed in the waste sewage. Since the waste to be treated in the drum is always situated in the lower portion of the drum 11 due to gravitational forces, as best illustrated in FIGS. 2, 3 and 6, it follows that air will only be communicated to those tubular members 49 located in the lower segment of the drum 11. In order to accomplish this, an air distribution system is provided that includes a plurality of poppet valves 54 in cooperation with an annular air manifold 55 as best illustrated in FIG. 3 where for clarity only one of the poppet valves is illustrated. These valves 54 are situated in each of the fixed rigid tube sections 51 which protrude beyond the inlet end plate 14 and they project into the body of an annular ring member 56 that forms a part of the manifold 55. The annular ring member 56 is fixedly fastened to the exterior surface of the inlet end plate 14 of the drum 11 and is adapted to rotate with the drum. Each poppet valve 54 comprises a valve head 57 situated at the end of a hollow tube section 58 which in turn is slidably mounted in the end of the rigid tube section 51 which protrudes through the end plate 14 and the valve head cooperates with its respective valve seat 59 that is provided in the ring member 56 to accommodate the poppet valve head when the valve head is in its closed position. The valve heads 57 are each biased against their respective valve seats 59 by a compression spring 60 that is disposed around the tube section 58 between the end wall 61 of a cavity 62 in the member 56 and the valve head so that the valve heads normally engage their respective seats. Two inlet apertures 63 are located in the side walls of the hollow tube section 58 so that air can pass into the interior of the hollow tube section 58 and into the tube 51 when the attached valve head 57 is unseated. Provision is made for unseating each valve head 57 by means of a protuberance 64 which is formed on and extends from each valve head through a port 65 in the ring member 56 that has the valve seat 59 at one end. The protuberance 64 also extends into an annular groove 66 that is located in the ring member 56 that is in communication with the ports 65. These protuberances 64 are acted upon by a flanged shaped cam member 67 that extends into the annular groove 66 as each valve rotates into a position corresponding to that phase of drum rotation that is coincident with the aeration requirements of the waste treatment process to be carried out by the apparatus herein provided.

As best illustrated in FIGS. 3 and 4, the aforementioned valve seats 59 are formed in one end of the ports 65 that communicate with the annular groove 66 that is located in the ring member 56 which is adapted to receive air under pressure from an external source and a concentric stationary ring 68 covers the annular groove opening to form the fluid manifold 55. As best illustrated in FIG. 4, the stationary ring 68 is rigidly connected to the frame 22 by a mounting bracket 69 and the groove 66 is sealed with the aid of anti-friction seal rings 70 that are disposed on each side of the groove between the rotatable member 56 and stationary ring 68. Air under pressure can be supplied to the groove 66 of the manifold 55 through a threaded fitting 71 that is provided in the stationary ring 68 which is in communication with the groove 66 in order that a suitable air conduit 72 (FIG. 3) can be connected to the stationary ring. The flange shaped cam member 67 protrudes into the groove 66 from the lower portion of the stationary ring 68 and the cam member is adapted to operatively engage the protuberance 64 of each valve head 57 as the valves are rotated with the drum, so that each valve head is unseated from its respective seat 59 to establish an air communication path from the groove 66 of the mainfold 55 through the aperture 65, the apertures 63, the tube section 58 and tube section 51 to the aeration tube sections 50 that are situated in the lower portion of the drum 11. This cam member 67 extends from the lower portion of the ring 68 for approximately 60° on each side of the lowest point on the ring so that the valves 54 are held in their open positions for approximately 120° of rotation of the drum which is coincident with the immersion of the foraminous tube sections 50, that are operatively associated with the open valves, in the waste. As drum rotation continues and the protuberances 64 associated with each valve head 57 move out of contact with the stationary cam member 67 on the stationary ring 68, the compression springs 60 restore the respective valve heads to their fully closed positions against their respective valve seats 59 thus closing off the supply of air from the manifold to each associated foraminous tube section 50.

It should be noted that relatively low pressure air is adequate for the effective operation of the aeration system of the present invention so that the compressor size and power required for its operation are minimal.

As previously indicated, the hollow core member 30 accommodates a plurality of tubes which extend therethrough in an axial direction. These tubes serve as conduits for dispensing an anti-foam agent and a settling agent which are introduced to the waste sewage undergoing treatment in the drum according to the dictates of a sensing and control mechanism that will be described. These tubes are best seen in FIGS. 1, 2 and 3 of the drawings, where it will be noted that the tubes 73 and 74 extend from a conventional swivel housing 75 that is supported by a bracket 76 that is mounted on the stationary frame 22, which permits the tubes 73 and 74 to rotate as the drum 11 is rotated. Both tubes extend axially through the aperture 14a provided in the inlet end plate 14 and into the hollow core member 30. Tube 73 communicates with a supply of anti-foaming solution which is provided to it through the swivel housing 75. The tube 73 is curved at its other furthermost extremity so that it extends in a radial direction to an aperture 77 in the wall of the hollow core member 30 and thereby a path of communication is established so that the anti-foam agent can be dispensed to the waste sewage during the treatment process. Tube 74 similarly extends axially from the swivel housing 75 through the aperture 14a in the inlet end plate and into the hollow coremember 30. In the region of the convolution 31d of the helical member 29, the tube 74 curves outwardly in a radial direction and passes through an aperture in the wall of the hollow core member to establish a path of communication with the waste contained near this convolution so that a settling agent such as alum can be dispensed to the waste situated in this portion of the drum 11.

As best illustrated in FIG. 3, additional supply tubes 78, 79 and 80 are provided at the inlet end portion 13 of the drum 11 and they similarly pass through the aperture 14a in the end plate 14 for the purpose of communicating solutions such as an acid, base and an anti-foam solution from suitable reservoirs in response to the sensing and control system of the present invention to the waste sewage that accumulates near the first convolution 31a of the helical member 29.

The operation of the waste treatment apparatus of the present invention will be better understood if reference is made to FIGS. 6 and 7 in the drawings, which diagrammatically illustrate the timing and sequence of operations of the apparatus and its associated controls and auxiliary mechanisms as well as the conduct and progress of the waste reduction process as it occurs in accordance with the present invention.

As previously indicated, it is preferable that the waste sewage that is to be treated in the apparatus receive preliminary and basic treatment by utilizing conventional and generally available equipment to filter, degrease and comminute the waste prior to its introduction into the rotatable drum 11. However, it should be borne in mind that these initial steps, while not absolutely essential, are nevertheless recommended because they may be simply and economically accomplished and substantially improve the efficiency and rapidity with which the microbiological reduction of the waste can be accomplished in this apparatus, as well as in other more conventional systems relying on the microbiological reduction process to treat waste products. This is well known and appreciated by those skilled in the art since it has been well established that the presence of grease-like contaminants and large solid particles greatly retard the microbiological reduction process whether it occurs in basic cesspools or septic tanks or in the more elaborate waste treatment devices that are available or are proposed.

To obtain a better understanding of the invention the present embodiment will be described as it is configured to handle approximately 200 gallons of waste sewage daily. This quantity is representative of the approximate quantity of waste requiring treatment according to known standards, in connection with a dwelling housing a family of four persons, based on a waste sewage production of 50 gallons per day per person. In the present configuration a batch treatment quantity of 17 gallons per hour has been selected to facilitate the handling of this daily production quantity with ease as well as to accommodate surges in waste sewage production. Accordingly, the following references to treatment and removal rates are for purposes of illustration based on this specific 17 gallon batch quantity, but it should be understood and appreciated that larger or smaller quantities can readily be accommodated by simply enlarging or reducing the size of the components to accommodate greater or smaller quantities of waste sewage, depending upon the anticipated waste producing capabilities of a particular installation.

In the operation of the present embodiment, it is helpful to assume that the drum 11 is in operation and contains waste which has been undergoing a progressive microbiological reduction treatment process between the convolutions of the helical member 29. It should be basically understood, however, that the waste treatment within the improved apparatus of the present invention is accomplished by means of the so-called "batch" process. That is to say the waste sewage by means of this apparatus undergoes various stages of microbiological reduction and aerobic digestion which is nevertheless continuous as it proceeds in substantially segregated batches from the inlet end portion 13 toward the outlet end portion 19 of the drum 11. However, it should be borne in mind that the transition of each batch of waste sewage from one treatment stage to another is accomplished gradually as the drum 11 and helical member 29 is rotated so that as a practical matter each batch is for a limited time exposed to more than one treatment stage during this transitional period. In the present embodiment of the invention this process normally occurs during an 8-hour period, but can be automatically extended for a longer period, to assure the complete reduction and removal of contaminants during the treatment process as will be explained in greater detail. It will be noted from the diagram of FIG. 6 that this process occurs in four complete revolutions of the drum 11, which in the preferred embodiment occurs during the 8-hour period under normal circumstances, while the additional and ancillary process of separating and collecting the resulting clarified liquid effluent and the sludge as well as drying the sludge, will occur during an additional immediately following two-hour period.

The desired drum rotation during this treatment process is approximately one-half revolution per hour and is achieved by means of the operable relationship of the previously described drive mechanism comprising the drive motor 24, belt drive and pulley mechanism 25, tire 23 and roller 15 in conjunction with the ring band 17 provided on the exterior surface of the drum 11. It will be recognized, however, that these components can of course be varied to accommodate the larger or smaller components such as the drum 11 of the other apparatus that are configured to handle the greater or smaller capacity requirements of particular installations while preserving the ability to rotate the drum at approximately the desired one-half revolution per hour.

With reference to FIGS. 6 and 7 in the drawings and for purposes of illustration, it will be noted that the levels of the waste in the drum in the various treatment stages are diagrammatically indicated and labeled as they occur, and it should be fully understood and appreciated that such treatment of the wastes within the drum occurs continuously and simultaneously for each of the batches separated by the helices or convolutions of the helical member 29 that is located within the drum 11.

In the first stage, the waste sewage is delivered to the drum 11 through the inlet tube 12 which communicates with the source of the waste sewage and passes the waste through the aperture 14a that is provided at the center of the inlet end plate 14 of the drum 11. The incoming waste accumulates in the lower region at the inlet end portion 13 of the drum 11 and is isolated by the first helix or convolution 31a of the helical member 29. This accumulated waste may be heated and will be subjected to continuous aeration to encourage aerobic digestion of the waste, a well known and appreciated inducement to the microbiological reduction process. A conventional heating device such as an electrical resistance heater $H_1$ as shown in FIGS. 3 and 7 may be appropriately utilized to maintain the waste sewage in the drum 11 at a temperature that will be most conducive to the microbiological reduction of the waste. The heater $H_1$ is situated at the inlet portion 13 of the drum 11 so that it will normally be immersed in the waste sewage, as will hereinafter be described.

As illustrated in FIGS. 2, 3, 4, 6 and 7, aeration of the waste during this phase or stage of operation is brought about by means of the previously described aeration system, wherein air under pressure is supplied from a compressor or pump $P_1$ through the connecting conduit 72 and the fitting 71 to the air manifold 55 situated on the exterior surface of the inlet end plate 14 of the drum 11. From the manifold 55, the pressurized air is directed to each of the aeration tube sections 50 that are immersed in waste sewage in the drum as a result of the successive actuation of the poppet valves 54 situated at the end of each tubular member 49. Since the stationary cam member 67 extends continuously from the lower segment of the annular ring 68 for approximately 60° on each side of the vertical centerline of an imaginary arc that would be circumscribed by the drum 11 during its rotation, or a total of 120°, the cam member 67 will actuate and hold each of the poppet valves 54 open for the period of time corresponding to 120° of drum rotation. This corresponds to that period of time during which the associated particular tube sections 50 will be immersed in the waste in the drum. As previously mentioned, this valve actuation is caused by the cam member 67 acting upon the protuberance 64 provided in each valve head 57 against the force of the compression springs 60 to disengage the valve heads from their respective seats 59 that are provided at the end of the ports 65 in the manifold 55. When the valve heads 57 are disengaged from their respective seats 59, air from the manifold 55 is communicated through the ports 65, through the apertures in the wall of the hollow tubular section 58 of the valve to the interior of the tubular members 49. As heretofore mentioned the disposition of the foraminous tube sections 50 that forms part of the tubular members 49 permits air directed through these tubular members to escape through the foraminous tube section walls into the surrounding waste. In the first stage these foraminous tube sections 50 are provided between the end plate 14 and the first convolution 31a of the helical member 29 as best seen in FIG. 2 of the drawings, so that continuous aeration of the waste in this first treatment stage will occur.

At this point it will be helpful to note in FIG. 3 of the drawings, that several sensor probes associated with sensors S2, S3, S4 and S5 are adapted to be carried on a float 81 that is supported, but capable of vertical movement, on a shaft 82 that is disposed within the inlet end portion 13 of the drum. The shaft 82 is supported by the bracket 48 which is fastened to the frame 22 and which passes through the aperture 14a in the inlet end plate 14 of the drum, so that the shaft, the float, and the sensor probes carried thereon will remain stationary, except for the possible vertical movement of the float, as the drum is rotated. The aforementioned heater $H_1$ is fastened to the lowermost extremity of shaft 82 so that it will communicate with the waste that is accumulated in the drum 11. The float 81 is adapted to be immersed in but near surface of the accumulated waste in the inlet end portion 13, so that the sensor probes are in contact with the wastes in order that their associated sensors S2 through S5 monitor the conditions of the waste sewage at the inlet end portion of the drum 11. It should be understood that all of the sensors utilized in this waste treatment apparatus are conventional and commercially available and since their configuration and detailed operation are well known to those skilled in the art, only their functions will be described herein.

The sensor S2 will function to monitor the level of the waste sewage accumulated in the inlet end portion 13 of the drum 11, while the sensor S3 will monitor the level of foam that results from the treatment of the waste. The chemical concentration or pH of the accumulated waste in the inlet end portion is monitored by the sensor S4 while the temperature of the waste therein will be monitored by the sensor S5. Each of the aforementioned sensors may be previously calibrated so that they each will generate a signal when the various conditions to which they are sensitive, exceed or fall below a given range. The outputs or signals from each of these sensors are provided to a central control box C1 through signal conduits 85, 86, 87, 88 and 89, as indicated in the diagram of FIG. 7. This control box C1 is similarly of conventional design and is adapted to control the operation of the drum 11 of the present invention as well as its associated auxiliary apparatus such as the aforementioned aeration compressor $P_1$ and a chemical storage and a dispensing device D1 in a manner to be described.

The fluid level sensor S2 will operate to deliver a signal through signal conduit 85 to the control box C1 when the level of the waste at the inlet end portion 13 of the drum 11 exceeds or falls below a certain range. The control box C1, responsive to such a signal from the sensor S2, will operate to maintain the predetermined desired fluid level by permitting additional waste to be introduced into the drum or by restricting the input of additional waste into the drum 11 through the inlet tube 12, depending upon the nature of the signal from sensor S2. This may be accomplished through the actuation of an inlet valve (not shown) in gravity fed systems, or alternatively by controlling the operation of a waste feed pump (not shown) which can be affected through a signal conduit $85^1$ that is situated between the control box C1 and an inlet valve or feed pump which may be utilized for this purpose in any well known manner.

The control box C1 will also function to provide a signal to actuate the chemical storage reservoir and dispenser D1, as indicated in the diagram of FIG. 7. The actuation of the dispenser D1 is under the control of the control box C1 which upon receiving appropriate signals from the sensors S3 and S4 will activate the dispenser through signal conduits $86^1$, $87^1$ and $87^2$ which communicate between the control box C1 and the dispenser D1 to introduce respectively an anti-foam solution, or an acid or a base solution into the drum. It should be noted that suitable injection or pumping devices (not shown) or a gravity feed arrangement can be incorporated in the reservoir dispenser D1 to facilitate the introduction of these chemicals in any well known manner through the aforementioned supply tubes 78, 79 and 80 which communicate these chemicals from the reservoir dispenser D1 to the interior of the drum 11 by way of the aperture 14a in the inlet end plate 14 of the drum. The aforementioned electrical resistance heater $H_1$ will be activated or deactivated in response to signals delivered to the control box C1 by the temperature sensor S5 that is in communication with, and sensitive to, the temperature of the accumulated waste at the inlet end portion 13 of the drum 11. Signals from the temperature sensor S5 are communicated to the control box C1 through a signal conduit 88 while the signals from the control box C1 to activate or deactivate the heater $H_1$ are provided through signal conduit $88^1$. In this manner the waste sewage introduced to the drum for the purpose of undergoing the microbiological reduction process may be adjusted so that its foam content, temperature, and chemical concentration or pH will be controlled within the well known parameters that are most conducive to the microbiological waste treatment process.

While it has been assumed in this description that the waste to be treated by this apparatus is in continuous supply from an external source, it is obvious that a master actuating switch (not shown) can be readily provided to automatically shut down the apparatus when the supply of waste to be treated is depleted. Similarly, the operation of the apparatus could again be automatically initiated by actuation of such a master switch when the supply of waste to be treated has been reestablished.

It should also be borne in mind that the active microorganisms in the liquid waste introduced to the waste collected in the inlet end portion 13 of the drum 11 through the tube 46, as heretofore described in detail, feeds upon the pollutants in the accumulated waste sewage to encourage and precipitate the reduction process.

As the drum rotates, the initial batch of sewage is transferred longitudinally within the drum 11 toward the outlet end portion 19 of the drum and this initial batch of sewage becomes effectively isolated from the inlet region of the drum between the respective first and second convolutions 31a and 31b while a new batch of 17 gallons is being accumulated in the inlet end portion of the drum. The initial batch of 17 gallons which we are considering in this discussion, that has undergone continuous aeration and some degree of microbiological reduction by the combined action of the live microorganisms and aerobic digestion, thus begins to enter the second treatment stage as noted in FIG. 7. During this second treatment stage, aeration of the batch will not take place and the waste sewage will be permitted to settle for approximately one hour or for one complete drum revolution.

The ability to permit the waste in the second stage of processing to settle, that is, not to be subjected to aeration during this second stage, stems from the fact that the portions of the tubular members 49 located between the respective first and second convolutions 31a and 31b in the volume occupied by the waste sewage at this time are devoid of any foraminous tube sections 50. Consequently, although air is supplied to the tubular members 49 to satisfy the continuous aeration requirements of the first and latter treatment stages, the air within the tubular members 49 will not be supplied to the surrounding waste in those sections that are not provided with the foraminous tube sections.

As the waste in this second stage is permitted to settle the heavier material or slurry which may contain some solids, will settle to the bottom of the drum 11 while the relatively clear liquid effluent rises. The settling will be encouraged as a result of the lack of aeration during this stage which lasts for approximately one hour, although the drum 11 has nevertheless been continually rotated at the prescribed rate of one-half revolution per hour. As a result of the rotation of the drum 11, the volume of waste will have moved between the first and second convolutions 31a and 31b of the helical member as it gravitates toward the outlet end portion 19 of the drum 11, and as a result of the reduced spacing between the first and second convolutions that form part of the helical member 29, the level of the waste within the reduced volume brought about by the reduced spacing of the helices, will rise to a higher level than it was previously. The upper surface of the waste will thereby be brought into contact with an outlet port 83 (FIG. 2) which is provided in the side wall of the hollow core member 30 between the first and second convolutions 31a and 31b, so that a portion of the liquid waste, in this instance approximately 7 gallons of the clarified liquid effluent from the upper strata of the waste, will be drained through the port to the interior of the core member 30 and thence to the effluent container 35. It should be understood and appreciated that this quantity of the liquid effluent which is so removed from the upper strata of the treated waste, will have undergone sufficient microbiological reduction, so that it may be safely used or recycled after collection in the container 35. It should also be noted, that the aforementioned drum inclination assures that the clarified effluent will flow in the proper direction under the influence of gravity through the hollow core member 30 toward the outlet end portion 19 of the drum.

Of the initial 17 gallon batch of waste, approximately 10 gallons now remain and contain all of the pollutants which are to be acted upon during the continued processing within the drum 11 during the third treatment stage as indicated in the flow diagram of FIG. 7. At this point, it will be noted from the drawings, and in particular FIG. 2 thereof, that the configuration of the tubular members 49 is such that foraminous tube sections 50 are again situated between those convolutions of the helical member in which the remainder of the waste batch under discussion is now entering. At this point in time after approximately one hour of settling has taken place, the remaining batch of waste will again be aerated through the foraminous tube sections 50 that are disposed between the second and fourth convolutions of helices 31b and 31d of the helical member 29 and this aeration continues uninterrupted for approximately four more hours, which of course corresponds to two complete rotations of the drum 11. During this stage, the levels of the surface of the waste between the second convolution 31b and third convolution 31c and third convolution 31c and fourth convolution 31d will again be elevated as a result of the diminished spacing between these convolutions that contain the waste, and a part of this waste, approximately 10 percent of the remaining quantity in the drum, is communicated through the port 45 and the tube 46 in the hollow core 30, back to the inlet end portion 13 of the drum to seed the accumulating raw waste with active microorganisms, as heretofore described.

It should also be noted that a second foam sensor S1 is situated on the aforementioned sampling container 47 so that it will be receptive to and be in communication with the liquid waste from the third stage that is transported to the container 47 by the tube 46. The output of the sensor S1 is similarly fed to the controller C1 through a signal conduit 89 which, upon an appropriate signal from sensor S1, will actuate the chemical reservoir dispenser D1 through a signal conduit $89^1$ situated between the control box C1 and the dispenser D1, so that an anti-foam solution is introduced through the aforementioned tube 73 to the waste that is undergoing the third stage of treatment.

As the batch nears the end of the third treatment stage, it is exposed to a redox, or reduction sensor S6 which is also supported by the hollow core member 30. This sensor S6 is adapted to monitor the efficiency and progress of the microbiological reduction process which has thus far taken place, and it will function to provide an indication or signal to the control box C1 through a signal conduit 90. Based on this signal the control box can act through signal conduit $90^1$ which communicates between the control box C1 and the drum drive motor 24 to interrupt the current supply to the drum drive motor to prevent further rotation of the drum and thereby provide additional time for the continued aeration of the waste in the third treatment stage. This might be required in those instances when the waste has not received preliminary treatment as was heretofore mentioned and recommended, or in unusual circumstances when the treatment process has thus far been inadequate to assure the complete removal of the pollutants in the waste. Such a condition would be sensed by the redox sensor S6. In such cases, when the redox sensor S6 detects that the proper level of microbiological reduction has taken place during this continued aeration period, the current flow to the drive motor 24 will be re-established and the drum 11 will again begin to rotate.

After approximately a total of six hours of treatment within the drum under normal circumstances, that is to say exclusive of any added aeration and treatment time as might have been initiated by the redox sensor S6, the remaining waste between the convolutions of the helical member 29 will have reached the final or fourth treatment stage during which the waste will again be permitted to settle. During this stage as in the previous setting stage the batch will not be aerated. In this instance it will be observed that the batch is situated in that area of the helical member 29 between the fourth and fifth convolutions 32d and 32e which is not equipped with the aeration tube sections 50.

During the last phase of this final settling stage, the turbidity of the waste will be monitored by a turbidity sensor S7, which is supported by the core member 30 and is in communication with the waste batch between the fourth and fifth convolutions of the helical member 29. The turbidity sensor S7 will provide an indication of the amount of solid material which may remain suspended in the otherwise clarified effluent, and when these suspended solids are excessive a signal will be provided to the control box C1 by the sensor S7 through a signal conduit 91. Upon receiving such a signal the control box C1 will, through signal conduit 91¹ disposed between the control box C1 and the dispenser D1, initiate the actuation of the chemical dispenser D1 to introduce a settling agent such as alum through the aforementioned tube 74 in the core member 30 to the batch of waste situated between the fourth and fifth convolutions in the drum 11.

As illustrated in FIGS. 1, 2 and 6, it should be noted that the electrical connections to the aforementioned redox and turbidity sensors S6 and S7 are made through a conventional electrical conduit and slip ring connection assembly 84 which is electrically connected to the sensors S6 and S7 through the center of the hollow core member 30.

It will be noted from the timing and sequence diagram of FIG. 6 that after the commencement of the final drum revolution, or approximately 7 hours 45 minutes after the commencement of the initial treatment of the waste sewage in the drum 11, that is excluding any added time which may have been initiated by the redox sensor S6, the clear effluent will gradually begin to exit over the edge 37 of the weir 31f as the drum rotates. This exiting process will continue for approximately 15 minutes to complete the normal 8-hour treatment period. As will best be noted in FIG. 2 of the drawings, the weir 31f is formed by a portion of the final convolution 31e of the helical member 29. This weir extends between the core member 30 and the interior surface of the inner drum member 33 which extends from the final convolution of the helical member 29, and as the drum 11 and the inner drum member 33 continue their rotation all of the clarified effluent will eventually exit over the weir edge 37 and into the effluent container 35 where it will be subjected to the further surface skimming operation as previously described.

It will be recalled from the previous discussion, that the inner drum-like member 33 that extends from the final convolution 31e of the helical member 29 is smaller in diameter than the drum 11 and is situated within the outlet portion 19 of the drum and thus it will only permit the clarified effluent that is located above the sludge to exit through it. It will be understood and appreciated that all of the sludge resulting from the microbiological reduction of the waste will accumulate at the bottom and outlet end portion 19 of the drum 11. The weir provided by the flat plate 38 that is bonded between the exterior of the drum-like member 33 and the interior of the outlet end portion 19 of drum 11 is in effect an extension of the final helix of the helical member 29. This plate serves to help accumulate the sludge in the bottom of the drum so that its microbiological reduction can continue and precludes its discharge until its edge is brought into the proper position by the continued rotation of the drum 11, whereupon the sludge will be permitted to exit past the weir 38 into the sludge container 34. It will also be noted that the previously described scraper 43 will prevent any substantial buildup of sludge on the exterior of the final helix 31e or the exterior surface of the inner drum-like member 33, or the outlet end portion 19 of the drum and facilitate the collection of the sludge in the aforementioned sludge collector.

As heretofore mentioned the clarified effluent resulting from the microbiological reduction of the waste is suitable for use or recycling in a number of ways and may be drained from the effluent container 35 through a suitable drain conduit 92 provided for the purpose, while the collected sludge in the container 34 may be collected over a considerable period and will be of considerable value as a nutrient or fertilizer. When sufficient quantities have been accumulated in the sludge container 34, its contents may be removed and another container substituted, or alternatively, other well known means may be employed to automatically convey the collected sludge to a remote location for storage, packaging or use in any desired manner.

It should also be noted that another advantage of the present configuration is the provision of a sufficient open area above the waste being treated in the drum 11 and above the waste that moves within the hollow core member 30 which precludes the entrapment of gases that may be liberated during the course of the microbiological reduction of the waste, as it is carried out by this improved waste treatment apparatus. Consequently, any such gases so liberated are continuously vented from the drum 11 as they form above the level of the waste, through the convolutions of the helical member 29 and the hollow core member 30 to the surrounding atmosphere. In addition a cover housing (not shown) can also be provided to enclose the waste treatment apparatus and serve to collect these gases. This cover housing may also be provided with suitable exhaust provisions (not shown) to convey any such collected gases to a remote location should this be desirable in a particular installation of this apparatus.

Although the invention has been described with reference to certain preferred embodiments, it will be understood and appreciated that variations and modifications may be made within the spirit and scope of the invention as defined in the appended claims.

What is claimed is:

1. A waste treatment apparatus or the treatment of waste such as sewage and the like comprising a rotatable drum having a waste inlet and at least one treated waste outlet, mounting means operatively associated with said drum for rotatably mounting said drum, means operatively connected to said drum for rotating said drum, a hollow core member disposed within said drum, means located within said hollow core member for permitting a portion of the treated waste to be communicated through said hollow core member to the waste located within said drum near the inlet of said drum, and a helical member having a plurality of convolutions disposed around and affixed to said hollow core member whose outer edges are sealingly affixed to the interior surface of said drum for assisting in transporting the waste within said drum as said drum rotates, said convolutions being more widely spaced from each other near the inlet end of said drum than near the outlet end of said drum in order to provide less volume for the waste between convolutions located near the outlet end of said drum than between the convolutions located near the inlet end of said drum, said convolutions having outer portions which separate said drum into a plurality of separate chambers for waste located in the lower portion of said drum.

2. The waste treatment apparatus of claim 1 wherein the longitudinal axis of said drum is inclined to cause the outlet end of said drum to be at a lower elevation than the inlet end of said drum.

3. The waste treatment apparatus of claim 1 wherein said hollow core member has a port located at a point where it will contact the waste for permitting waste to pass into the interior of said hollow core member and wherein said means for permitting a portion of the treated waste to be communicated through said hollow core member comprises a hollow elongated member located within said hollow core member, said hollow elongated member having one end connected to the port of said hollow core member and having its longitudinal axis inclined with respect to the longitudinal axis of said hollow core member to permit the waste entering the port of said hollow core member to be communicated to the waste located within said drum near the inlet of said drum.

4. The apparatus of claim 29 wherein the spacing between adjacently located convolutions varies continuously from the convolutions located near the inlet end of said drum to the convolutions located near the outlet end of said drum.

5. The waste treatment apparatus of claim 1 further comprising means operatively connected to said drum for separating the products from the waste treatment into a liquid and a sludge.

6. The waste treatment apparatus of claim 5 wherein said separating means comprises a hollow tubular member extending from the outlet end of said helical member.

7. The waste treatment apparatus of claim 6 including separate containment means located near said hollow tubular member for receiving the separated products resulting from the treatment of the waste.

8. A process for treating waste in an apparatus having a helical member comprising the steps of introducing waste into one end of said helical member, separating portions of the waste by said helical member, maintaining portions of the waste separated from each other by the convolutions of said helical member, rotating said helical member to cause translation of the waste, during translation of the waste caused by the rotation of said helical member subjecting different portions of the waste separated by the convolutions of the helical member to a successive plurality of different types of waste treatments, including aeration and settling and reducing the volume of the waste undergoing treatment as the waste is undergoing translation caused by the rotation of said helical member.

* * * * *